United States Patent Office 2,982,886
Patented May 2, 1961

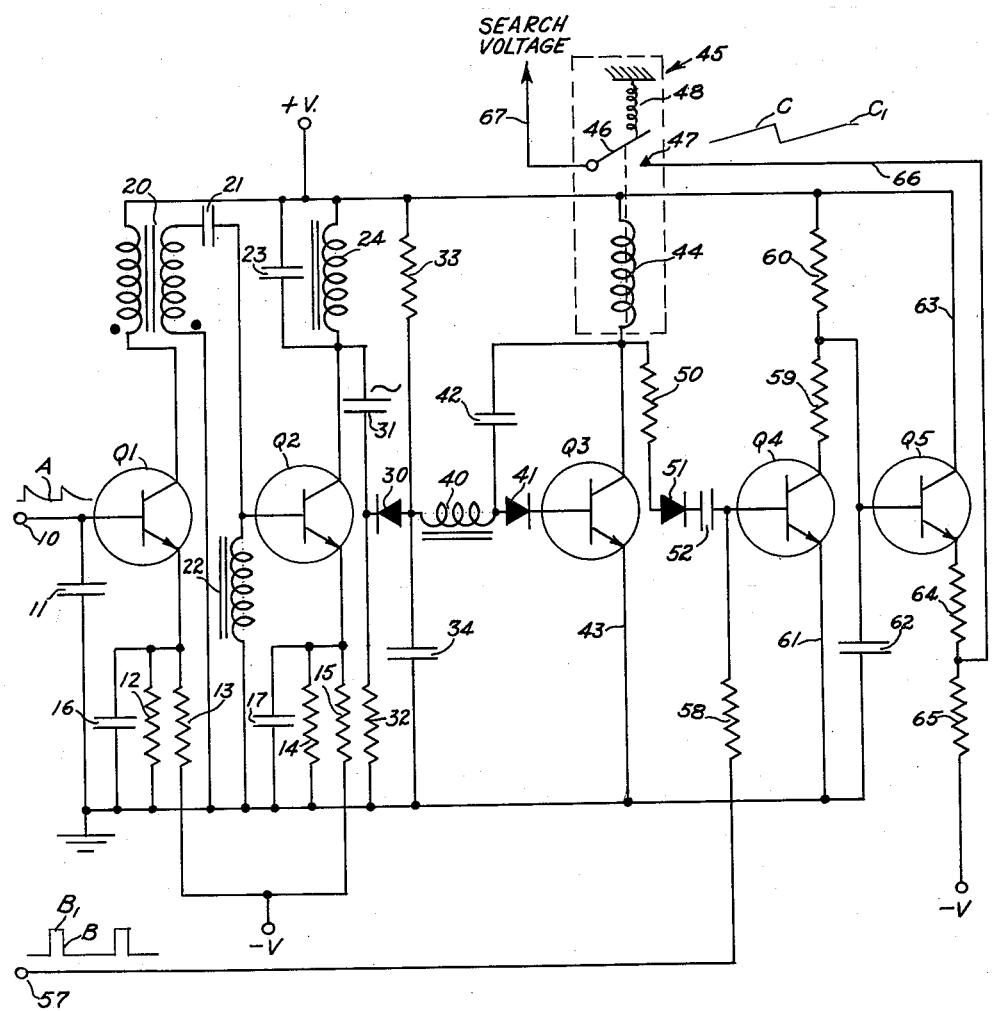

2,982,886

RADAR RANGE SEARCH AND LOCK-ON CIRCUIT

Eugene S. McVey, Lafayette, Ind., assignor to the United States of America as represented by the Secretary of the Navy Filed July 11, 1958, Ser. No. 748,095

10 Claims. (Cl. 317—148.5)

(Granted under Title 35, U.S. Code (1952), sec. 266)

The invention described herein may be manufactured and used by or for the Government of the United States of America for governmental purposes without the payment of any royalties thereon or therefor.

This invention relates to electronically switched electronic circuitry and more particularly to semiconductor circuitry for producing radar ramp function search voltages with automatic switch controlling target lock-on more specifically adaptable for use in radar range units.

Radar ranging and lock-on circuits are known in circuit constructions utilizing vacuum tubes and power transformers for providing ramp function search voltages and target lock-on switching circuits. While such vacuum tube circuits have proved to be successful in operation, the reliability thereof is only to the extent that vacuum tubes are reliable and the life of such vacuum tubes is unpredictable as is well known by those skilled in the art. The radar ranging circuits used for national defense in mobile units or conveyances such as aircraft are subjected to considerable vibration which is often responsible for shortening the life of radar ranging vacuum tube circuits. Also, vacuum tube circuits require power transformers which make such circuits of considerable bulk and weight which is objectionable for aircraft use where space and weight limitations are at a premium.

As may be understood in the radar art, a ramp voltage is developed from some minimum voltage to some maximum voltage to correspond to the minimum and maximum ranges of the radar system. For example, a voltage range from zero to one hundred volts may be made to correspond to zero range in yards to ten thousand yards range; that is, a ratio may be established of one hundred yards per volt. The ramp voltage, which is often referred to as a ramp function search voltage, would vary from zero to one hundred volts in radar systems. If, during the radar range search, a target object appears within the ten-thousand yard capabilities of the radar, for example, it is desirable to have the ramp function search voltage stabilize at the voltage level of the ramp representative of the range of the target object. If the target object is five thousand yards away, the ramp function search voltage should stabilize at fifty volts. It is important, then, to develop accurate ramp function search voltages and means to "lock-on" or stabilize at a voltage level representative of the range of a target object in space.

In the present invention a semiconductor or transistor circuit combination has been developed to produce ramp function search voltages, which circuit incorporates means for interrupting the ramp function search voltage at any point that a target object is detected in a radar system in which this circuit is used. While semiconductors, such as transistors, are specifically referred to in describing the invention, it is to be understood that all suitable semiconductor devices may be used although known by other names. In this invention three transistors are used in combination to produce repeated ramp function search voltages in accordance with square wave pulses received at a predetermined repetition rate. One of the transistors controls a relay switch in the output circuit conducting the ramp function search voltages whereby the ramp function search voltages may be interrupted at any point upon the occurrence of a target echo signal being received in the radar system. The combination of three transistors provides means constructed and arranged to establish an initial plateau on any ramp function search voltage, upon the appearance of an echo target signal, prior to disconnection of the output circuit to facilitate lock-on in range by other circuitry of the radar system. Target echo signals are received by a combination of two transistor amplifiers which include high and low frequency filter circuits to pass only echo target signals and to eliminate substantially all noise echo signals. The amplifier circuit produces an alternating current from the target echo signals, which signals are rectified for controlling the search and lock-on circuit as heretofore described. A circuit utilizing semiconductors, such as transistors, is greatly simplified in comparison with vacuum tube circuits in that semiconductor circuits may be driven directly from the voltage source of the aircraft or like conveyance without the necessity of transforming the energy to different voltage levels. Such a circuit utilizing semiconductors is extremely light in weight and small in size in comparison with similar vacuum tube circuits. Semiconductors used within their voltage and current limitations have a long predictable life and they are substantially unaffected by vibration. It is, therefore, a general object of this invention to provide a semiconductor combination for producing ramp function voltages from triggering pulses, which ramp function voltages may be interrupted at any point in correspondence with amplified signal pulses to initiate a plateau in any ramp function voltage at a level dictated by the signal pulses immediately prior to ramp function voltage cutoff.

It is a further object of this invention to provide a circuit combination as set forth hereinabove in the general object, which invention has particular utility in radar range devices wherein search and lock-on of any target may be accomplished for establishing the range of such a target object.

These and other objects, advantages, features, and uses may become more apparent to those skilled in the art upon the further consideration of the drawing representing the preferred form of the invention, as described by the detailed description in which the drawing illustrates a circuit schematic diagram of a preferred form of transistor circuit in carrying out this invention.

Referring more particularly to the figure of the drawing, there is shown five transistors identified by the reference characters $Q_1$, $Q_2$, $Q_3$, $Q_4$, and $Q_5$. Transistor $Q_1$ has its base coupled to a terminal 10, which terminal is adapted to receive radar echo signals from a target of a type of waveform, as shown above this base conductor by the reference character A. The base of transistor $Q_1$ is coupled through a capacitor 11 to ground, which capacitor, together with the impedance of the incoming circuit to the terminal 10, provides a low-pass filter. The five transistors are shown herein as being of the N-P-N type for the polarities shown although P-N-P type transistors may be utilized where the polarities are reversed. The transistors $Q_1$ and $Q_2$ each have the emitters thereof coupled to a voltage divider circuit consisting of resistors 12 and 13, and 14 and 15, respectively, to a negative voltage source. Each transistor $Q_1$ and $Q_2$ also has its emitter coupled through a by-pass capacitor 16 and 17, respectively, to ground.

The base of transistor $Q_2$ is coupled through a transformer 20 to the collector of transistor $Q_1$, this collector being in circuit with the primary winding coupled to a positive voltage source. One lead of the secondary winding of transformer 20 is coupled directly to ground, while the other lead thereof is coupled through a capacitor 21 and an inductance 22 serially to ground, the base of transistor $Q_2$ being connected directly to the junction of the two elements 21 and 22. The capacitor 21 and the inductance 22 function as a hi-pass filter for voltage signals appearing in the secondary of transformer 20. The collector of transistor $Q_2$ is coupled to the positive voltage source through a parallel circuit consisting of a capacitor 23 and an inductance 24, which parallel circuit functions as a resonant circuit at the frequency of echo range signals A applied to the base of transistor $Q_1$ and amplified on the collector thereof.

The output of the transistor amplifier $Q_2$ taken from the collector is rectified by a rectifying diode 30 having its cathode coupled to the junction of a capacitor 31 and a resistor 32 connected serially between the collector of transistor $Q_2$ and ground. The anode of the rectifying diode 30 is coupled to the junction of a resistor 33 and a capacitor 34 coupled serially between the positive voltage source and ground. The above described circuit is an amplifier and rectifier combination for amplifying and rectifying any radar echo signals, such as A, being applied at terminal 10. In the absence of any echo signals, as A, transistor $Q_2$ will be nonconductive and the anode terminal of the rectifier diode 30 will be at a voltage established by the positive voltage applied through the resistor 33.

The search and lock-on circuitry includes the three transistors $Q_3$, $Q_4$, and $Q_5$, the first transistor $Q_3$ of which has its base coupled to the anode of rectifier 30 through an inductance 40 and a unidirectional diode 41 oriented with the anode coupled to the inductance 40 and the cathode to the base of transistor $Q_3$. The inductance 40 functions to smooth the voltage signals applied to the base of transistor $Q_3$ although other suitable elements may be used for this function. The collector of transistor $Q_3$ has a feedback circuit to the base thereof through an integrating capacitor 42 to the junction of the inductance 40 and the unidirectional diode 41. The emitter of transistor $Q_3$ is coupled directly to ground by a conductor 43 and the collector is coupled through an electromagnetic coil 44 of a relay switch 45 to the positive voltage source. The relay coil 44 electromagnetically controls switch contacts 46 and 47 of the relay switch normally held open by a spring 48, as is well understood in the relay art. During nonconductive periods of the transistor $Q_3$ the relay contacts 46 and 47 are held open by the spring 48, but upon conduction of the transistor $Q_3$ the contacts 46 and 47 will be closed by the electromagnetic action of the relay coil 44.

The transistor $Q_4$ has its base coupled to a branch circuit, one branch of which consists of a serial coupling from the collector of the transistor $Q_3$ through a resistor 50, a unidirectional diode means 51, and a capacitor 52, and the other branch circuit of which connects a terminal 57 through a resistor 58. The terminal 57 is adapted to receive positive square wave voltage signals of a predetermined repetition rate illustrated by the waveform B for initiating repeated ramp function search voltages, as will hereinafter be more fully described. The unidirectional diode means 51, has in addition to the function of transmitting signals from the collector of transistor $Q_3$ to the base of transistor $Q_4$, the function of blocking the feedback of square waves applied at terminal 57 to the collector of transistor $Q_3$. The collector of transistor $Q_4$ is coupled to the positive voltage source serially through resistors 59 and 60, and the emitter is coupled directly to ground through a conductor 61. The junction of the resistors 59 and 60 is coupled to ground through a storage capacitor 62, which junction is also coupled directly to the base of transistor $Q_5$. The collector of transistor $Q_5$ is coupled directly by a conductor 63 to the positive voltage source, while the emitter of this transistor is coupled serially through resistors 64 and 65 to a negative voltage source to place the emitter and collector of this transistor in a circuit. The junction of resistors 64 and 65 is coupled by a conductor 66 to contact 47 of the relay 45, contact 46 being coupled to the lead 67 for transmission to other circuitry of a radar device for use, this other circuitry forming no part of this invention. The conductors 66 and 67 constitute the output circuit for this invention on which output conductors the ramp function voltages such as C are transmitted. The plateau of short duration illustrated by $C_1$ represents the initial range voltage produced in a manner which will be more fully described in the description of operation in this invention to follow immediately.

In the operation of this invention let it be assumed, for the purpose of example, that this search and lock-on circuitry is incorporated in a radar ranging device in which the terminal 10 is coupled to a radar receiver of echo signals, the terminal 57 is coupled to a square wave generator or oscillator, and the output lead 67 is coupled to a radar range memory circuit or other circuitry for indicating or otherwise utilizing radar search and range voltage. In the absence of any target echo signals being received over terminal 10, the transistor amplifiers $Q_1$ and $Q_2$ will be quiescent, producing no rectified results by the rectifier diode 30. The positive voltage conducted by way of resistor 33 will be impresssed on the base of transistor $Q_3$ through the series circuit of inductance 40 and unidirectional diode means 41 to bias the base of transistor $Q_3$ sufficiently positive to produce conduction through the emitter and collector thereof, thereby energizing the relay coil 44 to hold the contacts 46 and 47 engaged. Since current flow through the relay coil 44 and transistor $Q_3$ is direct current, any voltage bias thereof will be blocked from the base of transistor $Q_4$ by the capacitor 52. The square waves B impressed at the terminal 57 are applied through the resistor 58 to the base of transistor $Q_4$ to cause conduction of this transistor at the plateau $B_1$ of the applied square waves for a time period equal in time to the time duration of the $B_1$ plateau. Conduction of transistor $Q_4$ discharges storage capacitor 62 through resistor 59 and collector and emitter of $Q_4$ to ground over the conductor 61. Upon the occurrence of the trailing edge of the square wave B, transistor $Q_4$ is cut off and storage capacitor 62 will charge in a positive direction at a rate determined by the resistor 60. The base of transistor $Q_5$ being coupled to the junction of resistors 59 and 60 will cause the base voltage to vary in accordance with the charge and discharge of storage capacitor 62, which charge and discharge cycles must occur within the time of the respective square waves initiating the ramp function voltages. This base voltage of transistor $Q_5$ will be followed on the emitter thereof to produce a repeated ramp function voltage C of a frequency corresponding to the square wave pulses B applied to the base of transistor $Q_4$. The relay switch contacts 46 and 47 being closed in this phase of operation will transmit the ram function search voltages over the conductor 67 to related circuits for use, as is well understood by those skilled in the radar art.

Upon the occurrence of echo signals applied to the terminal 10 and represented by the waveform A, transistor $Q_1$ will conduct in an alternating current manner to induce this alternating current into the secondary of transformer 20 for application to the base of transistor $Q_2$. Any signals caused by noise applied to terminal 10 will be filtered out by the capacitor 11 and the capacitor 21 and inductance 22 combination to provide a band of frequencies corresponding to the band of echo voltage signals A. The echo signal alternations are resonate in the parallel circuit composed of the elements 23 and 24. The alternating current on the collector of transistor $Q_2$ will be conducted through the capacitor 31 to ground through the resistor 32 producing a reduction in voltage and consequently a current flow from the positive voltage source through resistor 33 and the rectifying diode 30 to ground through the resistor 32. This conduction through 33, 30, and 32 will produce a reduction in bias voltage on the base of transistor $Q_3$ to cut off the conduction thereof. The conduction cutoff of transistor $Q_3$ is delayed in time by the integrating capacitor feedback circuit 42 to cause a slight delay in the opening of the relay contacts 46 and 47 for reasons immediately to be herein described. The approach of cutoff of the transistor $Q_3$ will produce a voltage drop at the collector of this transistor, which voltage drop will be applied by way of the series circuit 50, 51, and 52, to the base of transistor $Q_4$ to stabilize the charge on the storage capacitor 62 for an instant which will be applied to the base of transistor $Q_5$ to produce the plateau $C_1$ in the ramp function voltage C on the output conductors 66 and 67. This plateau $C_1$ of short duration is produced just prior to the opening of switch contacts 46 and 47 to break the circuit in the output conductors 66 and 67. The voltage level of $C_1$ transmitted to subsequent radar circuitry over the conductor 67 initiates a lock-on voltage determinative of the range of a target object identified by the input signal A. The ramp function search voltage C is interrupted to hold the radar range search voltage at a level for subsequent circuitry and at the same time initiates the range voltage $C_1$ for search and lock-on operation of a radar ranging system.

Upon the termination of the radar ranging echo signals A applied to terminal 10, the amplifier circuit, including transistor circuits $Q_1$ and $Q_2$, will again become quiescent, whereupon positive voltage bias will be applied through resistor 33 to the base of transistor $Q_3$ to re-establish the continuity of contacts 46 and 47 to again start ramp function search voltages C to be generated in accordance with the square wave pulses B. In this manner, ramp function search voltages are produced and a range voltage of an intercepted target object is provided in this circuit for automatically producing search and lock-on in a radar ranging system of which this invention is particularly applicable.

While the above-described circuitry is particularly adapted for radar range circuits, it may also have other applications of producing ramp function voltages for other purposes which may be controlled by cutting off such ramp function voltages in accordance with specific or predetermined signals applied to terminal 10. Further, while many modifications and changes may be made in the circuit construction illustrated herein to provide certain obvious results and functions, it is to be understood that I desire to be limited only in the constructional and functional results by the scope of the appended claims.

What is claimed is:

1. In a switch controlling semiconductor circuit comprising: an amplifier and unidirectional circuit combination constructed and arranged to produce direct current voltages on an output thereof proportional to input alternating current voltage signals; and a semiconductor network having two inputs, an output, and a current controlling relay, said network including three tri-electrode transistors in which the first transistor has said one input coupling the base thereof to said amplifier and unidirectional circuit output with said base biased between a voltage source and a fixed potential and said current controlling relay in its collector circuit to said voltage source, the second transistor has its base coupled to a square wave signal source and to the collector of the first transistor and its collector coupled to discharge a storage capacitor, the emitters of said first and second transistors being coupled to said fixed potential, and the third transistor has its base coupled to said storage capacitor, its emitter coupled to said network output, and its collector coupled to said voltage supply, and said relay having switch contacts connected serially in said network output, whereby said one input being coupled to said amplifier and unidirectional circuit output is arranged for interrupting said network output whenever voltage signals are applied to said amplifier and unidirectional circuit, and the other network input being coupled to said square wave source is for activating said network to produce ramp function voltage waves on said network output.

2. In a switch controlling semiconductor circuit as set forth in claim 1 wherein said amplifier and unidirectional circuit includes a pair of transformer coupled tri-electrode transistors having the emitters and collectors thereof coupled across a voltage supply to bias same, the first of which has a base coupled to receive said input alternating current voltage signals, and the second of which has its collector coupled through a rectifier to said semiconductor network providing unidirectional current flow in said amplifier and unidirectional circuit.

3. In a switch controlling semiconductor circuit for producing search and target lock-on functions in a radar ranging system comprising: an amplifier having an input for receiving radar echo signals and having an output providing alternating voltages from said input signals; a rectifying diode coupled to said amplifier output for rectifying said alternating voltages; an electrical switch; and a semiconductor network having one output coupled through said electrical switch, having another output coupled to a voltage source and operative to actuate said electrical switch, having one input coupled to be responsive to the rectifier output, and having another input adapted to receive square voltage waves of predetermined repetition rate, said semiconductor network being constructed and arranged to produce ramp voltage waves, representative of search voltages, over said one output and to cause a disconnection of said one output when echo signals appear at said amplifier input whereby search voltages are produced until lock-on occurs with the appearance of an echo signal.

4. In a switch controlling semiconductor circuit as set forth in claim 3 wherein said semiconductor network includes three tri-electrode transistors, the first of which has its base coupled to said rectifying diode output constituting said one input and one of its other electrodes coupled through an electromagnetic actuator of said electrical switch to said voltage source constituting said other output, the second of which has its base coupled to said one of the other electrodes of the first and adapted to be coupled to said square voltage waves constituting said other input and its other electrodes coupled in parallel to a capacitor, and the third of which has its base coupled to said capacitor and one of its other electrodes coupled to said semiconductor network output constituting said one output, and the other of said other electrodes of said first and third transistors being coupled to a fixed potential and said voltage source, respectively, to provide operating potentials therefor.

5. In a switch controlling semiconductor circuit as set forth in claim 4 wherein said amplifier includes two tri-electrode semiconductors having the emitters and collectors thereof coupled across a voltage source to bias same, the first of which has a base constituting said input for receiving radar echo input signals, and the second of which has a base inductively coupled to one of the electrodes of said first semiconductor and one of its other electrodes constituting said output through said rectifying diode.

6. In a switch controlling semiconductor circuit as set forth in claim 5 wherein said transistors are N-P-N-'s in which said one of the other electrodes in said first of the semiconductor network is the collector, and said one of the other electrodes of said third transistor in said semiconductor network is the emitter.

7. In a switch controlling semiconductor circuit as set forth in claim 6 wherein said second transistor in said semiconductor network coupled to the collector of said first transistor is serially through a unidirectional means and a blocking capacitor whereby said second transistor is affected simultaneously with opening of said electrical switch to level off said ramp search voltage at the instant of electrical switch opening.

8. In a switch controlling semiconductor circuit as set forth in claim 7 wherein said coupling of the base of said first transistor in said semiconductor network includes an inductance and a diode for smoothing out ripples and permitting signals of one polarity to be impressed on said last-mentioned base, said last-mentioned base being biased at the junction of said inductance and rectifying diode; and the collector of said first transistor in said semiconductor network being coupled through an integrating capacitor to the base thereof for slowing down the actuation of said electrical switch.

9. In a switch controlling semiconductor circuit as set forth in claim 8 wherein said second transistor in said semiconductor network has the parallel coupling of said other electrodes and said capacitor coupled through a current controlling resistor to said voltage source for charging said capacitor over a predetermined interval of time.

10. A radar search and lock-on transistor circuit comprising: an amplifier of transistor stages having an input thereto adapted to receive radar echo signals and an output having a resonant circuit at the echo signal frequency, said amplifier having high and low filter means for filtering out frequencies above and below the echo frequency band; a rectifier coupled to the output of said amplifier to rectify alternating currents thereof; a relay switch having an electromagnetic actuating coil; and a transistor network for producing ramp function search voltages in an output circuit thereof, said network including three tri-electrode transistors, the first of which has its base coupled serially through an inductance and a diode from said rectifier and having a base bias thereon and a collector-to-base integrating feedback circuit and which has the emitter and collector coupled across a voltage source with the collector coupling being through said relay actuating coil, the second transistor which has its base coupled serially through a resistance, a diode, and a capacitor to the collector of said first transistor and adapted to be coupled to a square wave voltage source with the emitter and collector coupled in parallel with a storage capacitor, said parallel coupling having a supply voltage applied thereto for charging said storage capacitor, and the third transistor which has its base coupled to said storage capacitor and its emitter and collector coupled across a voltage supply, said emitter further being coupled through said relay switch constituting said output circuit of said transistor network whereby said transistor network is capable of producing ramp function voltage waves on the output circuit thereof upon the application of square voltage waves on the base of said second transistor and whereby the application of echo signals at the input of said amplifier will switch the conduction of said first transistor to apply a pulse to said second transistor producing a plateau in said ramp function voltage at the instant of relay actuation by said first transistor to open said network output circuit thereby creating a search and lock-on voltage wave output for radar systems.

References Cited in the file of this patent

UNITED STATES PATENTS

| | | |
|---|---|---|
| 2,533,898 | Robinson et al. | Dec. 12, 1950 |
| 2,761,130 | Kibler | Aug. 28, 1956 |
| 2,804,612 | Rogers | Aug. 27, 1957 |